United States Patent [19]

Ley et al.

[11] Patent Number: 4,530,960

[45] Date of Patent: Jul. 23, 1985

[54] LOW TEMPERATURE CURE, ACTIVATED ESTER COATING COMPOSITION WITH IMPROVED POT LIFE

[75] Inventors: David A. Ley, Stamford, Conn.; Susan M. Cady, Yardley, Pa.

[73] Assignee: American Cyanamid Co., Stamford, Conn.

[21] Appl. No.: 529,235

[22] Filed: Sep. 6, 1983

[51] Int. Cl.$^3$ .................. C08J 39/00; C08K 39/00
[52] U.S. Cl. ..................... 524/555; 525/328.2; 525/379; 525/381; 525/382; 526/304
[58] Field of Search ............ 525/328.2, 379, 381, 525/382; 524/555; 526/304

[56] References Cited

U.S. PATENT DOCUMENTS 4,303,563 12/1981 Emmons et al. ............ 525/328.2 X
4,446,280 5/1984 Cady et al. .................... 525/186

Primary Examiner—Paul R. Michl
Assistant Examiner—S. Babajko
Attorney, Agent, or Firm—Steven Hultquist; Henry C. Jeanette

[57] ABSTRACT

A low temperature cure, two component coating composition having an improved balance between pot life and speed of cure is provided. The coating composition includes a crosslinkable, solvent borne, solution polymer containing certain activated ester groups, and a hemiaminal. Also provided is a crosslinked coating obtained by curing the composition. Additionally, there is provided a process for increasing the pot life of a low temperature cure coating composition. The process includes the step of forming a hemiaminal from a crosslinking agent preferably prior to mixing the crosslinking agent with the polymer.

19 Claims, No Drawings

4,530,960

LOW TEMPERATURE CURE, ACTIVATED ESTER COATING COMPOSITION WITH IMPROVED POT LIFE

TECHNICAL FIELD

This invention relates to low temperature cure thermoset resins. More particularly, this invention relates to a two component coating composition based upon a crosslinkable, solvent borne, solution polymer containing activated ester groups, in admixture with a blocked crosslinking agent. The present invention further relates to a crosslinked coating formed from the coating composition, and to a process for increasing the pot life of a coating composition containing the crosslinkable polymer and a crosslinking agent.

BACKGROUND ART

Low temperature cure coating compositions based on crosslinkable, solvent borne, solution polymers containing activated ester groups, as illustrated by U.S. patent application Ser. No. 346,329, filed Feb. 5, 1982, now abandoned and U.S. patent application Ser. No. 377,504, filed May 12, 1982, now U.S. Pat. No. 4,446,280 are known to us. In a coating composition of this type, coatings must be prepared within minutes of mixing the polymer with the crosslinking agent.

It is known, as exemplified by Chem. Abstracts 93: 205,753q (1980), that a system with good storage stability is formed by the admixture of a ketimine with an epoxy polymer even though the epoxy group thereof is amine-reactive. Systems of this type require one equivalent of water for each ketimine group in order to hydrolyze the ketimine, thereby unmasking the primary amine group thereof for crosslinking the amine-reactive polymer. In use, the water for hydrolysis is provided by the ambient atmosphere after the composition has been coated onto an appropriate surface. Accordingly, a drawback of systems of this type is the requirement of humidity control to prepare reproducible coatings and a slower curing time.

Hence, there has existed a continuing need for a low temperature cure, two component, solvent borne coating composition having, when mixed, an improved balance between pot life and speed of cure. Therefore, the provision of such a coating composition would constitute a significant advance in the art.

SUMMARY OF THE INVENTION

It is accordingly an object of the present invention to provide a low temperature cure, two component, solvent borne coating composition having, when mixed, an improved balance between pot life and speed of cure.

A further object is to provide a crosslinked coating obtained by curing this type of composition.

A still further object is to provide a process for increasing the pot life of a low temperature cure coating composition.

Additional objects, advantages and novel features of the invention will be set forth in the description which follows, and in part will become apparent to those skilled in the art upon examination of the following or may be learned by practice of the invention.

To achieve the foregoing objects and in accordance with the purpose of the present invention, as embodied and broadly described herein, there is provided a low temperature cure, two component coating composition. This coating composition includes, when the two components are mixed, a particular crosslinkable, solvent borne, solution polymer, and a certain hemiaminal. The polymer contains from about 1 to 100 wt. % of repeating units derived from an activated ester-containing vinyl monomer of the formula

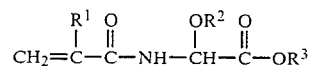

in which the $R^1$ group is selected from H and $CH_3$, the $R^2$ group is selected from alkyls of 1-6 carbon atoms, cycloalkyls of 5-6 carbon atoms, and 2-hydroxyalkyls of 2-6 carbon atoms, and the $R^3$ group is selected from alkyls of 1-6 carbon atoms, cycloalkyls of 5-6 carbon atoms, and 2-hydroxyalkyls of 2-6 carbon atoms. Any balance of repeating units making up the polymer is derived from one or more copolymerizable ethylenically unsaturated comonomers.

The hemiaminal is made from a hemiaminal-forming, volatile ketone, and a crosslinking agent having a plurality of primary amine groups, each capable when in the free amine form, of replacing the $OR^3$ moiety by nucleophilic substitution. The crosslinker is present in an amount sufficient to produce a crosslinked polymer when the primary amine groups thereof are in the free amine form. The coating composition, as just indicated, contains the crosslinking agent in the form of the hemiaminal. This coating composition provides an excellent balance between pot life and speed of cure.

Also provided by the present invention are a crosslinked coating obtained by curing the coating composition, and a process for increasing the pot life of a low temperature cure coating composition. This coating composition includes the polymer described above and the crosslinking agent described above. The essential step of the process is the formation of a hemiaminal from the crosslinking agent, typically prior to admixing the crosslinking agent with the polymer.

DETAILED DESCRIPTION

As explained earlier, it is known that a stable system is formed when a ketimine and an epoxy polymer are mixed together. This sytem requires the absorption of one equivalent of water for each ketimine group to hydrolyze the ketimine to a free primary amine. Hemiaminals cannot normally be used because of the equilibrium that exists between the free amine and aminal. Epoxy systems are generally too reactive to allow stabilization under these circumstances.

Unexpectedly, we have found that hemiaminals can function to provide good stability to systems that contain certain activated ester groups as the amine-reactive functionality. The reaction between the activated ester groups and the small amount of free amine that is present as a result of the amine/aminal equilibrium, is slow until film formation at which time the ketone rapidly evaporates from the film. This rapid evaporation allows a much faster cure than a ketimine system. Thus, the hemiaminal-containing system of the present invention is characterized by outstanding balance between two opposing characteristics: the system has a sufficiently long pot life prior to being coated, and has a sufficiently rapid speed of cure after being coated, for remarkable commercial utility. In short, our hemiaminal based-coating composition provides exceptional balance between pot life and speed of cure. Water is not required to activate the amine; the evaporation of the ketone from the film is all that is required to deblock the amine.

The essential components of the composition of the present invention are a solvent borne, solution polymer bearing particular activated ester groups, and a certain hemiaminal. A necessary feature of the polymer is the presence of from about 1 to 100 wt. % of repeating units derived from an activated ester group-containing vinyl monomer of the formula

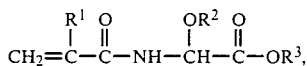

wherein the $R^1$ group is selected from H and $CH_3$, the $R^2$ group is selected from alkyls of 1-6 carbon atoms, cycloalkyls of 5-6 carbon atoms, and 2-hydroxyalkyls of 2-6 carbon atoms, and the $R^3$ group is selected from alkyls of 1-6 carbon atoms, cycloalkyls of 5-6 carbon atoms, and 2-hydroxyalkyls of 2-6 carbon atoms. It is preferred for the polymer to contain about 20-35 wt. % of these repeating units.

Suitable monomers include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Of course, the monomer could be a liquid mixture of monomers such as a mixture of MAGME, butyl acrylamidoglycolate methyl ether, methyl acrylamidoglycolate butyl ether and butyl acrylamidoglycolate butyl ether, with, for example, the major portion of the mixture being MAGME with an overall methyl/butyl ratio of about 3:1. A highly preferred polymer contains about 20-35 wt. % of repeating units derived from MAGME.

These monomers are suitably formed by the procedures set forth in U.S. patent application Ser. No. 346,329, which is discussed earlier, U.S. patent application Ser. No. 377,505, filed May 12, 1982, now U.S. Pat. No. 4,443,623 and U.S. patent application Ser. No. 377,506, also filed May 12, 1982, the monomer-forming procedures of which are hereby incorporated by reference into this description. Additionally, attention is invited to two illustrative procedures set forth later in the description of the present invention.

The hemiaminal is formed from a certain type of ketone and from a crosslinking agent having a plurality of primary amine groups, each capable when in the free amine form, of replacing the $OR^3$ moiety by nucleophilic substitution. The ketone must be sterically capable of forming the hemiaminal and must volatilize under low temperature cure conditions. Typical low to moderate boiling branched or unbranched ketones are suitable, with the unbranched ketones such as methyl ethyl ketone being preferred. Exemplary ketones include acetone, methyl ethyl ketone, methyl butyl ketone, methyl isobutyl ketone, methyl amyl ketone, cyclohexanone, and 4-heptanone.

Conveniently, the crosslinking agent has two to four primary amine groups available for crosslinking, and is typically a diamine. Illustrative amines include 1,3-bis(aminomethyl) cyclohexane, 1,4-bis(aminomethyl) cyclohexane, m-xylenediamine, 1,3-propanediamine, 1,6-hexanediamine, 4,7-dioxodecane-1,10-diamine, 1,2-cyclohexanediamine, bis(3-aminopropyl)diethylene glycol, and an amine-terminated triazine resin.

The triazine resin is conveniently obtained according to the procedures set forth in U.S. patent application Ser. No. 377,504, filed May 12, 1982, the triazine resin-forming procedures of which are hereby incorporated by reference into this description. In this regard, the resin is obtained by either melt condensation of the aminotriazine compound with the amine in the presence of an acid catalyst at temperatures of 120° to 250° C. or by reaction of the chloride (such as cyanuric chloride) with the amine in the presence of an acid scavenger. Examples are given in U.S. Pat. No. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959.

A later invention of which we are aware, which is disclosed and claimed in copending application U.S. Ser. No. 529,234, filed Sept. 6, 1983 in the name of Roland DiLeone, is directed to a sterically unhindered, trifunctional primary amine crosslinking agent such as N,N'-bis(6-aminohexyl)-2-[(6-aminohexyl)amino]-butanediamide. As disclosed and claimed in copending application U.S. Ser. No. 529,233, filed Sept. 6, 1983, now U.S. Pat. No. 4,495,366, in the names of D. A. Ley and H. Burkhard, this compound is best prepared by the following procedure: Dimethyl maleate (72 g, 0.5 moles) is added over a 2-3 hour period to a solution of 1,6-hexanediamine (174 g, 1.5 moles) in toluene (360 g) at 75°-80° C. The reaction temperature rises from 80° to 110° C. under reflux conditions. After the addition is completed, methanol is distilled at a reaction temperature of 120°-125° C. Additional toluene (320 g) is added to maintain reaction volume. The reaction may be followed by amine titration or by disappearance of the methyl ester in the $^1$H NMR spectrum. After the reaction is complete, toluene is removed under vacuum (50°-70° C., 15°-20 mm Hg) to give the desired compound as a viscous liquid which solidifies on standing.

The crosslinker is employed in the composition in an amount sufficient to create a crosslinked polymer, when the nucleophilic primary amine groups thereof are in the free amine form. The coating composition, of course, contains the crosslinking agent in the form of the hemiaminal. The amount of the crosslinker may vary widely and is generally determined by a number of factors such as the extent of crosslinking desired and the particular reactants employed. Generally, the primary amine groups of the crosslinker in the composition will range from about 0.5 to 10 equivalents based on the activated ester functionality of the polymer employed. Preferably, about 0.8 to 1.2 equivalents of amine groups are used.

Unlike systems such as epoxies where amines function as catalysts, this system containing activated ester groups is not appreciably catalyzed by free amine so that even the use of a stoichiometric amount of ketone to form the hemiaminal provides a sufficient pot life for commercial applications. The ketone and the crosslinker may be mixed together to form the hemiaminal in a ratio ranging from about 1:1 to about 10:1 equivalents of the ketone to the crosslinker, with an about 2:1 to 3:1 ratio being convenient.

As explained, the polymer contains from about 1-100 weight percent of repeating units derived from the activated ester-containing vinyl monomer. Any balance of repeating units is derived from one or more copolymerizable ethylenically unsaturated monomers. Such monomers include $C_1-C_{18}$ alkyl esters of acrylic acid, $C_1-C_{18}$ alkyl esters of methacrylic acid, styrene, acrylonitrile, maleic and fumaric acids, and functional acrylates such as 2-hydroxyethylacrylate, acrylic acid and acrylamide.

Conveniently, the activated ester-containing monomer may be polymerized, or more preferably copolymerized with these other monomers, by the polymerization techniques set forth in U.S. patent application Ser. No. 377,504, which is discussed earlier, the polymer-forming procedures of which are hereby incorporated by reference into this description. Attention is also invited to the illustrative procedures set forth below in the description of the present invention.

The low temperature cure coating composition of the present invention is preferably made by combining the ketone with the crosslinker, and then blending the resulting mixture with the crosslinkable polymer. Alternatively, the crosslinking agent could be combined with the polymer prior to addition of the ketone.

The crosslinkable polymer is cured by reaction with the unblocked crosslinking agent described earlier, under low temperature cure conditions. By "low temperature" is meant from about ambient temperature up to and including about 50° C., and, in certain instances, up to and including about 100° C.

The composition of the present invention is readily cured as a coating, by exposure to an appropriate low temperature for an adequate period of time. The speed of curing depends upon factors including the particular temperature at which curing is carried out, the components forming the composition, and the presence or absence of an accelerator. Compared to a composition that is identical except that the primary amine groups of the crosslinker thereof are free rather than blocked, the composition of the present invention has a superior pot life. By "superior" is meant at least about 4-8 hours, with the pot life typically being on the order of from about 8 to 24 hours.

The compositions of the present invention are useful as general purpose coatings, as well as coatings in automotive, wood, decorative, textile and paper applications. As automotive coatings, the compositions may be used as topcoat and repair coatings.

As a further aspect of this invention there is provided a process for increasing the pot life of a low temperature cure coating composition that includes the crosslinkable, solvent borne, solution polymer of the present invention and the crosslinking agent described earlier. This process is carried out by forming the hemiaminal from the crosslinking agent, preferably prior to admixing the crosslinking agent with the polymer.

In the illustrative procedures which follow, all parts and percentages are by weight, and the temperature is ambient temperature, unless otherwise specified.

PREPARATION OF ACTIVATED ESTER GROUP-CONTAINING MONOMERS

Preparation of Methyl Acrylamidoglycolate Methyl Ether (MAGME)

To a three-necked flask equipped with a stirrer and an extractor filled with a molecular sieve drying agent is added 300 parts acrylamidoglycolic acid, 3000 parts methanol, 0.05 parts phenothiazine, 4.5 parts 98% sulfuric acid and 200 parts chloroform. The mixture is heated to reflux and the distillate is allowed to pass through the extractor for 6 ½ hours. The mixture is cooled and allowed to stand for 16 hours at which point the mixture is warmed to about 40° C., 19 g of sodium carbonate is added, and the solution is stirred for 2 ½ hours. The mixture is filtered and vacuum stripped of solvent. The solid residue is extracted with chloroform. Diethyl ether is added to the extract and a polymeric mass precipitates which is discarded. The remaining extract is stripped of solvent to yield 264.2 parts of crude MAGME.

Preparation of Butyl Acrylamidoglycolate Butyl Ether

One hundred parts of acrylamidoglycolic acid, 517 parts butanol, 1 part conc. sulfuric acid and 0.1 part monomethyl ether of hydroquinone are mixed in a flask equipped with a Dean Stark water trap and a stirrer. The mixture is heated until homogeneous. After 5–10 minutes, 100 ml of toluene is added and the mixture is brought to reflux and held 5 hours until the theoretical amount of water is collected by azeotrope. The toluene and excess butanol are removed under vacuum to yield 173 parts of the crude product.

PREPARATION OF POLYMERS

Polymer A

Methyl acrylamidoglycolate methyl ether, in the amount of 160 parts, is dissolved in 312 parts absolute ethanol and 342 parts toluene. To this are added 20 parts methacrylic acid, 248 parts butyl acrylate, 396 parts methyl methacrylate, 8 parts n-dodecyl mercaptan and 21 parts t-butylperoxyisobutyrate. The monomer mixture is placed in a dropping funnel and purged with nitrogen for 20 minutes. Toluene, 80 parts, is placed in a flask and heated to 85° C. The monomer mixture is added slowly to the flask over a 2-hour period. The reaction mixture is held at 83° C. for an additional 3-hour period. The resulting polymer solution is filtered hot through a preheated pressure funnel using filter aid. After cooling, the polymer is ready for use.

The polymer has the following characteristics: clear yellow color, dish solids (2 hours at 105° C.) 54.9% non-volatiles, and Brookfield viscosity (20 rpm, #2 spindle) 832 centipoises.

Polymer B

The procedure used for Polymer A is again followed except that the reactants are as follows:

| | |
|---|---|
| methyl acrylamidoglycolate methyl ether | 60 parts |
| methacrylic acid | 10 parts |
| butyl acrylate | 132 parts |
| methyl methacrylate | 206 parts |
| t-butylperoxyisobutyrate | 10.6 parts |
| ethanol | 154 parts |
| toluene | 211 parts |

The resulting polymer is a clear, yellow liquid with dish solids of 53.6% non-volatiles.

Polymer C

To a flask equipped with a stirrer, condenser, nitrogen inlet and thermometer are added 100 parts ethyl acrylamidoglycolate ethyl ether dissolved in 252 parts toluene, 64 parts butyl acrylate, 116 parts methyl methacrylate, 7.2 parts methacrylic acid and 5.76 parts azobisisobutyrylnitrile. The solution is purged with nitrogen for 30 minutes and heated to 83° C. for 2 ½ hours.

The resulting polymer is a clear yellow liquid with dish solids of 49.2% non-volatiles.

Polymer D

The procedure used for Polymer A is again followed except that the reactants are as follows:

| | |
|---|---|
| mixed alkyl acrylamidoglycolate alkyl ether | 200 parts |
| acrylic acid | 20 parts |
| butyl acrylate | 234 parts |
| methyl methacrylate | 142 parts |
| styrene | 204 parts |
| N—dodecylmercaptan | 16 parts |
| t-butylperoctoate | 16 parts |
| ethanol | 244 parts |
| toluene | 330 parts |

The mixed alkyl acrylamidoglycolate alkyl ether is a liquid composition consisting of the following: methyl acrylamidoglycolate methyl ether, butyl acrylamidoglycolate methyl ether, methyl acrylamidoglycolate butyl ether, and butyl acrylamidoglycolate butyl ether, the major portion being the methyl ester/methyl ether compound with an overall methyl/butyl ratio of about 3/1. The resulting polymer is a clear yellow liquid with dish solids of 58.3% non-volatiles.

EXAMPLE 1

To a polymer made of 20% MAGME, 30% butyl acrylate, 27.5% styrene, 20% methyl methacrylate and 2.5% acrylic acid, having a weight average molecular weight of about 48,000 and dish solids of 62.2% non-volatiles in 2-ethoxyethanol, and contained in a Gardner-Holt viscosity tube, there is added an amine-terminated triazine resin (equivalent weight =277, 50% solids in 2-ethoxyethanol) in a ratio of one equivalent of amine functional group to one equivalent of activated ester functional group. Immediately afterwards, methyl isobutyl ketone is added to the mixture in a ratio of approximately 3 parts of the ketone to one part of the amine. The resulting composition is observed to have gelled about 48 hours later.

COMPARATIVE EXAMPLE 1

The procedure of Example 1 is followed except that no methyl isobutyl ketone is added. The resulting composition gels within one hour of admixing the polymer and the triazine resin.

The composition of Example 1 is cast into films on panels and cured at ambient temperature, 50° C., and 100° C. The ambient temperature cure is carried out for 24 hours, and a 20 minute cure time is used for the 50° C. and 100° C. cures. The cured films are rubbed with methyl ethyl ketone. It is found that to remove 50% of the cured film, more than 200 rubs are required for the film cured at 100° C., and 50 rubs for the film cured at 50° C. When this latter film is post-cured for 24 hours at ambient temperature, it is found that 200 rubs are required. The ambient cured film also required 200 rubs after a 24 hour cure time. It is found that the coating composition of Example 1 has better pot life, and has equivalent solvent resistance compared to the coating composition of Comparative Example 1, after 1 day ambient cure.

EXAMPLE 2

To 9 parts of the polymer of Example 1, there is added 0.6 parts of 1,6-hexanediamine in 1.3 parts of methyl isobutyl ketone. There is formed a coating composition having an improved pot life compared to a composition that is identical except that no methyl isobutyl ketone is added.

EXAMPLE 3

To 9 parts of the polymer of Example 1, 0.9 parts of 4,7-dioxodecane-1,10-diamine in 3.1 parts of methyl isobutyl ketone is added. A coating composition is produced having an improved pot life relative to an identical composition to which ketone is not added.

The above examples are illustrative of this invention. It is to be understood that these examples are not in any way to be interpreted as limiting the scope of this invention. Rather, it is intended that the scope of the invention be defined by the claims set forth below.

We claim:

1. A low temperature cure, two component coating composition comprising, when the two components are mixed together, (a) a crosslinkable, solvent borne, solution polymer containing from about 1 to 100 weight percent of repeating units derived from an activated ester-containing vinyl monomer of the formula

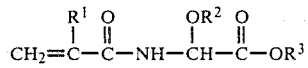

wherein the $R^1$ group is selected from H and $CH_3$, the $R^2$ group is selected from alkyls of 1-6 carbon atoms, cycloalkyls of 5-6 carbon atoms, and 2-hydroxyalkyls of 2-6 carbon atoms, and the $R^3$ group is selected from alkyls of 1-6 carbon atoms, cycloalkyls of 5-6 carbon atoms, and 2-hydroxyalkyls of 2-6 carbon atoms; with any balance of repeating units derived from one or more copolymerizable ethylenically unsaturated comonomers; in admixture with (b) a hemiaminal made from a hemiaminal-forming, volatile ketone, and a crosslinking agent having a plurality of primary amine groups, each capable when in the free amine form, of replacing the $OR^3$ moiety by nucleophilic substitution, the hemiaminal being present in an amount sufficient to produce a crosslinked polymer when the primary amine groups of said crosslinking agent are in said free amine form.

2. The coating composition of claim 1, wherein the polymer contains about 20-35 weight percent of said repeating units derived from said activated ester-containing vinyl monomer.

3. The coating composition of claim 1, wherein said activated ester-containing vinyl monomer is methyl acrylamidoglycolate methyl ether.

4. The coating composition of claim 1, wherein the polymer contains about 20-35 weight percent of repeating units derived from methyl acrylamidoglycolate methyl ether.

5. The coating composition of claim 1, wherein said crosslinking agent has two to four of said primary amine groups.

6. The coating composition of claim 1, wherein the ketone is a branched ketone.

7. The coating composition of claim 1, wherein the ketone is methyl isobutyl ketone.

8. A crosslinked coating obtained by curing the composition of claim 1.

9. A process for increasing the pot life of a low temperature cure coating composition comprising (a) a crosslinkable, solvent borne, solution polymer containing from about 1-100 weight percent of repeating units derived from an activated ester-containing vinyl monomer of the formula

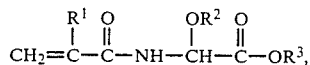

wherein the $R^1$ group is selected from H and $CH_3$, the $R^2$ group is selected from alkyls of 1-6 carbon atoms, cycloalkyls of 5-6 carbon atoms, and 2-hydroxyalkyls of 2-6 carbon atoms, and the $R^3$ group is selected from alkyls of 1-6 carbon atoms, cycloalkyls of 5-6 carbon atoms, and 2-hydroxyalkyls of 2-6 carbon atoms; with any balance of repeating units derived from one or more copolymerizable ethylenically unsaturated comonomers; and (b) a cross-linking agent having a plurality of primary amine groups, each capable when in the free amine form of replacing the $OR^3$ moiety by nucleophilic substitution;

said process comprising forming a hemiaminal from said crosslinking agent by reaction of said crosslinking agent with a hemiaminal-forming, volatile ketone.

10. The process of claim 9, wherein the polymer contains about 20-35 weight percent of said repeating units derived from said activated ester-containing vinyl monomer.

11. The process of claim 9, wherein said activated ester-containing vinyl monomer is methyl acrylamidoglycolate methyl ether.

12. The process of claim 9, wherein the polymer contains about 20-35 weight percent of repeating units derived from methyl acrylamidoglycolate methyl ether.

13. The process of claim 9, wherein said crosslinking agent has two to four of said primary amine groups.

14. The process of claim 9, wherein the ketone is a branched ketone.

15. The process of claim 9, wherein the ketone is methyl isobutyl ketone.

16. The coating composition of claim 1, wherein the ketone is an unbranched ketone.

17. The coating composition of claim 1, wherein the ketone is methyl ethyl ketone.

18. The process of claim 9, wherein the ketone is an unbranched ketone.

19. The process of claim 9, wherein the ketone is methyl ethyl ketone.

* * * * *